(12) United States Patent
Salimi et al.

(10) Patent No.: US 10,915,013 B2
(45) Date of Patent: Feb. 9, 2021

(54) FOLDED INTEGRATOR ROD DEVICE

(71) Applicant: CHRISTIE DIGITAL SYSTEMS USA, INC., Cypress, CA (US)

(72) Inventors: Abdul Waheed Salimi, Cambridge (CA); Micheal Plouffe, Guelph (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 0 days.

(21) Appl. No.: 16/508,873

(22) Filed: Jul. 11, 2019

(65) Prior Publication Data

US 2021/0011366 A1 Jan. 14, 2021

(51) Int. Cl.
| | |
|---|---|
| G03B 21/20 | (2006.01) |
| G03B 21/28 | (2006.01) |
| F21V 8/00 | (2006.01) |
| G02B 27/28 | (2006.01) |
| G02B 27/14 | (2006.01) |

(52) U.S. Cl.
CPC ......... *G03B 21/208* (2013.01); *G02B 6/0046* (2013.01); *G02B 27/14* (2013.01); *G02B 27/28* (2013.01); *G03B 21/2073* (2013.01)

(58) Field of Classification Search
CPC ...... G02B 6/0046; G02B 27/14; G02B 27/28; G03B 21/208; G03B 21/2073
See application file for complete search history.

(56) References Cited

U.S. PATENT DOCUMENTS

| | | |
|---|---|---|
| 6,324,330 B1 | 11/2001 | Stites |
| 2001/0048562 A1 | 12/2001 | Bartlett et al. |
| 2005/0063196 A1 | 3/2005 | Li |
| 2005/0134825 A1 | 6/2005 | Schuster |
| 2006/0044523 A1 | 3/2006 | Teijido et al. |
| 2008/0278460 A1* | 11/2008 | Arnett ................... G06F 3/0428 345/175 |
| 2010/0118284 A1 | 5/2010 | Ferguson et al. |
| 2010/0277779 A1 | 11/2010 | Futterer et al. |
| 2016/0047969 A1* | 2/2016 | Lim ..................... G02B 6/0036 362/612 |

FOREIGN PATENT DOCUMENTS

EP 1701199 A1 9/2006

* cited by examiner

*Primary Examiner* — Joseph L Williams
*Assistant Examiner* — Jacob R Stern
(74) *Attorney, Agent, or Firm* — Perry + Currier, Inc.

(57) ABSTRACT

A folded integrator rod device is provided comprising: a plurality of integrator rods that are substantially parallel and arranged adjacent to each other in a series in a substantially perpendicular direction to longitudinal axes thereof, pairs of adjacent integrator rods in the series being optically coupled at respective optical coupling ends via total internal reflection, a respective cross-section of each of the plurality of integrator rods, other than a first integrator rod, being larger than the respective cross-section of a previous adjacent integrator rod in the series, the first integrator rod in the series comprising a light entrance face configured to receive light, the light entrance face opposite an optical coupling end of the first integrator rod, and a last integrator rod in the series comprising a light exit face configured to emit the light, the light exit face opposite a respective optical coupling end of the last integrator rod.

15 Claims, 10 Drawing Sheets

FOLDED INTEGRATOR ROD DEVICE

BACKGROUND

Homogenization of light, for example for projectors, can be done using integrator rods. For example, light from a light source, such as one or more elliptical lamps and/or one or more laser arrays, and the like, is homogenized (and/or shaped) in a projector using an integrator rod, prior to the light interacting with a light modulator. To achieve optimal homogenization (e.g. uniformity) of the light, the length of the integrator rod must be long enough to provide ample internal reflections. This may pose a logistical challenge since a size (e.g. a length) of an optical system that includes the integrator rod will increase as length of the integrator rod is increased. Hence, for at least compact projectors, this may generally increase their length.

BRIEF DESCRIPTIONS OF THE DRAWINGS

For a better understanding of the various embodiments described herein and to show more clearly how they may be carried into effect, reference will now be made, by way of example only, to the accompanying drawings in which.

DETAILED DESCRIPTION

Figure 1:
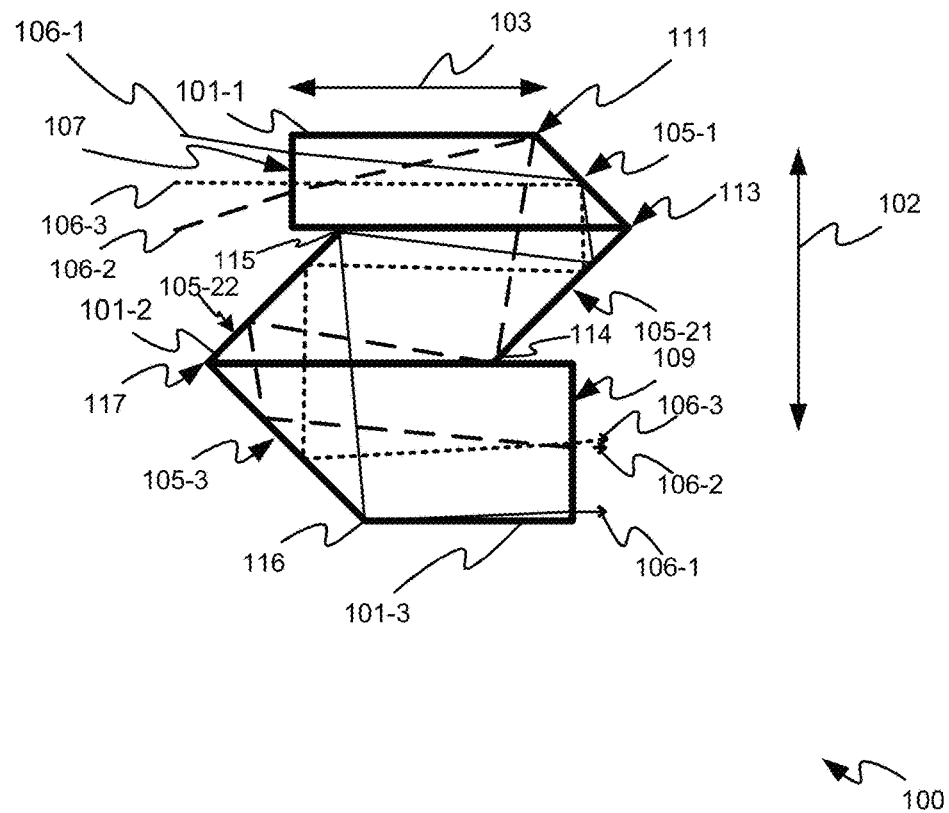
FIG. 1 depicts a side schematic view of a folded integrator rod device for a projector, according to non-limiting examples.

Homogenization of light, for example for projectors, can be done using integrator rods. For example, light from a light source, such as one or more elliptical lamps and/or one or more laser arrays, and the like, is homogenized (and/or shaped) in a projector using an integrator rod, prior to the light interacting with a light modulator. To achieve optimal homogenization (e.g. uniformity) of the light, the length of the integrator rod must be long enough to provide ample internal reflections. This may pose a logistical challenge since a size (e.g. a length) of an optical system that includes the integrator rod will increase as length of the integrator rod is increased. Hence, for at least compact projectors, this may generally increase their length.

To address this, the present specification provides a device comprising: a plurality of substantially parallel integrator rods arranged adjacent to each other in a series in a substantially perpendicular direction to longitudinal axes thereof, pairs of adjacent integrator rods in the series being optically coupled at respective optical coupling ends via total internal reflection, a respective cross-section of each of the plurality of integrator rods, other than a first integrator rod, being larger than the respective cross-section of a previous adjacent integrator rod in the series, the first integrator rod in the series comprising a light entrance face configured to receive light, the light entrance face opposite an optical coupling end of the first integrator rod, and a last integrator rod in the series comprising a light exit face configured to emit the light, the light exit face opposite a respective optical coupling end of the last integrator rod.

Hence, the present specification provides for a folded integrator rod device in which homogenization of light occurs by via "folding" a light path through a plurality of substantially parallel integrator rods via total internal reflection at ends of the substantially parallel integrator rods. A length of the present folded integrator rod device may be about ⅓ a length of a standard (e.g. non-folded) integrator rod to achieve a same degree of homogenization, for example using three substantially parallel integrator rods. In particular, each substantially parallel integrator rod has a larger cross-section than a previous substantially parallel integrator rod.

In particular an aspect of the present specification a device comprising: a plurality of integrator rods that are substantially parallel and arranged adjacent to each other in a series in a substantially perpendicular direction to longitudinal axes thereof, pairs of adjacent integrator rods in the series being optically coupled at respective optical coupling ends via total internal reflection, a respective cross-section of each of the plurality of integrator rods, other than a first integrator rod, being larger than the respective cross-section of a previous adjacent integrator rod in the series, the first integrator rod in the series comprising a light entrance face configured to receive light, the light entrance face opposite an optical coupling end of the first integrator rod, and a last integrator rod in the series comprising a light exit face configured to emit the light, the light exit face opposite a respective optical coupling end of the last integrator rod.

Attention is next directed to FIG. 1 which depicts a side schematic view of a folded integrator rod device 100 for a projector and/or a projector system. In other words, the folded integrator rod device 100 is generally used as an integrator rod and/or light homogenization device for a projector and/or a projector system. Hereafter the folded integrator rod device 100 is interchangeably referred to as the device 100.

As depicted the device 100 comprises a plurality of substantially parallel integrator rods 101-1, 101-2, 101-3 (interchangeably referred to hereafter, collectively, as the rods 101 and, generically, as a rod 101) arranged adjacent to each other in a series in a substantially perpendicular direction 102 to longitudinal axes 103 thereof (e.g. one longitudinal axis 103 is depicted). As depicted, the device 100 comprises three rods 101, however the device 100 may comprise as few as two rods 101 (e.g. see FIG. 5, described below), or any suitable number of rods 101 greater than three (e.g. see FIG. 6, described below).

Furthermore, while the rods 101 are each depicted as touching adjacent rods 101, in other examples there may be gaps between one or more of the rods 101 (e.g. see FIG. 3, described below).

In general, pairs of adjacent integrator rods 101 in the series are optically coupled at respective optical coupling ends 105-1, 105-21, 105-22, 105-3 (interchangeably referred to hereafter, collectively, as the optical coupling ends 105 and, generically, as an optical coupling end 105) via total internal reflection, as described in more detail below. As there are three rods 101, there are two pairs of rods 101 in the device 100 (e.g. the rods 101-1, 101-2 form a first pair, and the rods 101-2, 101-3 form a second pair).

In general, the first integrator rod 101-1 in the series comprises alight entrance face 107 configured to receive light (e.g. light 106-1, 106-2. 106-3, interchangeably referred to hereafter, generically and collectively, as the light 106) the light entrance face 107 being opposite an optical coupling end 105-1 of the first integrator rod 101-1, for example along a longitudinal axis 103 thereof. The optical coupling end 105-1 is generally at angle to upper and lower walls of the integrating rod 101-1.

In general, a last integrator rod 101-3 in the series comprises a light exit face 109 configured to emit the light 106 (e.g. as homogenized light), the light exit face 109 being opposite a respective optical coupling end 105-3 of the last integrator rod 101-3, for example along a longitudinal axis 103 thereof.

The light 106 may comprise red light (e.g. the light 106-1), green light (e.g. the light 106-2), and blue light (e.g. the light 106-3) which enters the light entrance face 107 of the of the first integrator rod 101-1. While the light 106 is depicted as rays of light entering the light entrance face 107, it is understood that the light 106 has a respective etendue and generally comprises a cone of light; for example, each ray of light 106 depicted may indicate a center of a respective cone of light. Furthermore, while each ray of light 106 is entering the light entrance face 107 at a different respective angle, the light 106 may enter the light entrance face 107 at the same angle and/or any suitable angle. Indeed, the angle and/or etendue and/or cone of the light 106 may generally depend on one or more light sources (not depicted) producing the light 106 (for example one or more elliptical lamps, one or more laser arrays, and the like), as well as optics (not depicted) between the one or more light sources and the light entrance face 107. Furthermore, while present examples are described with respect to three different colors of light (e.g. red, green, and blue light), the light 106 may be of any suitable color and/or one or more colors (e.g. including, but not limited to, white light).

The paths of the light 106 (e.g. the rays of the light 106) are depicted in FIG. 1. In general, the light 106 enters the light entrance face 107, propagates through the first integrator rod 101-1 until the light 106 reaches the optical coupling end 105-1 of the first integrator rod 101-1. While not depicted, the light 106 generally reflects from walls of the first integrator rod 101-1 while propagating therethrough. Indeed, while not depicted, the light 106 generally reflects from walls of all the rods 101 while propagating therethrough, for example also via total internal reflection. In some examples, the walls of the rods 101 may be coated with reflecting material to prevent the light 106 from exiting therethrough.

The light 106 is reflected into the second integrator rod 101-2 by reflecting from the optical coupling end 105-1 of the first integrator rod 101-1.

Hence, the optical coupling end 105-1 is at an internal reflection angle to the light 106; in some examples, the optical coupling end 105-1 may be at about 45 (or any other suitable angle) to a longitudinal axis 103 of the first integrator rod 101-1, which in general may cause the optical coupling end 105-1 to be at a total internal reflection angle to the light 106 impinging thereupon. Indeed, it is understood that the angles at which the light 106 enters the light entrance face 107 are known, and that the index of refraction of the rods 101 are also known (which may be the same or different from one another); hence the angle of the optical coupling end 105-1 may be selected such that the optical coupling end 105-1 is at an internal reflection angle to the light 106.

As depicted, the light 106 enters the second integrator rod 101-2, and reflects from a first optical coupling end 105-21 of the second integrator rod 101-2 through the second integrator rod 101-2 to a second optical coupling end 105-22 of the second integrator rod 101-2 opposite the first optical coupling end 105-21. As such, a path of the light 106, and/or a direction of travel of the light 106, is substantially reversed in the second integrator rod 101-2 as compared to the first integrator rod 101-1.

The length and shape of the second integrator rod 101-2, including angles of the optical coupling ends 105-21, 105-22, are selected accordingly. In particular, angles of the optical coupling ends 105-21, 105-22 (e.g. to a respective longitudinal axis 103 of the rod 101-2) may be selected such that the optical coupling ends 105-21, 105-22 are each at an internal reflection angle to the light 106, similar to the optical coupling end 105-1.

Hence, for example, the respective optical coupling ends 105-1, 105-21 of the rods 101-1, 101-2 are selected such that the light 106 enters the second integrator rod 101-2 after reflection from the first integrator rod 101-1 and reflects from the first optical coupling end 105-21 towards the second optical coupling end 105-22. As such, the pairs of adjacent integrator rods 101-1, 101-2 in the series of rods 101 are optically coupled at respective optical coupling ends 105-1, 105-21 via total internal reflection.

Similarly, the light 106 reflects from the second optical coupling end 105-22 into the third integrator rod 101-3, and reflects from the optical coupling end 105-3 of the third integrator rod 101-3 towards the light exit face 109 (e.g. opposite the optical coupling end 105-3). The angle of the optical coupling end 105-3 may be selected such that the optical coupling end 105-3 is at an internal reflection angle to the light 106, similar to the other optical coupling ends 105.

As such, the pairs of adjacent integrator rods 101-2, 101-3 in the series of rods 101 are optically coupled at respective optical coupling ends 105-22, 105-3 via total internal reflection. Furthermore, a path of the light 106, and/or a direction of travel of the light 106, is substantially reversed in the third integrator rod 101-3 as compared to the second integrator rod 101-2.

Hence, in general, pairs of adjacent integrator rods 101 in the series of rods 101, are optically coupled at the respective optical coupling ends 105 via total internal reflection to substantially reverse a travel direction of the light 106 as the light 106 is reflected from a first adjacent integrator rod 101 in a pair to a next adjacent integrator rod 101 in the pair.

Furthermore, each of the plurality of integrator rods 101 are angled at a total internal reflection angle at the respective optical coupling ends 105 to optically couple the respective optical coupling ends 105 via total internal reflection.

In this manner, the light 106 travels back and forth through the device 100, reflecting from walls of the rods 101; propagation through the rods 101 generally homogenizes the light 106. As such, each of the rods 101 comprise any suitable material, such as fused silica, and the like, which homogenizes the light.

Further, presuming each of the rods 101 are about the same length, and as the path of the light 106 is "folded" back and forth through the device 100, the length of the path of the light 106, and thus the degree of homogenization, is similar to an integrator rod having the same optical homogenization properties as the rods 101, but which is three times the length. Hence, the length of the device 100 (e.g. in a direction of the longitudinal axes 103) may be about one third a respective length of such an integrator rod.

As depicted, a path of the light 106-2 is selected to reflect from an edge 111 of the optical coupling end 105-1 that is adjacent a wall of the remainder of the rod 101-2 (e.g. as depicted, and with respect to the page of FIG. 1, an upper wall, though the device 100 may be in any suitable orientation). It is further understood that that edges 113 of the optical coupling ends 105-1, 105-21 that are adjacent are selected to about align with each other. As such, the dimensions of the rod 101-2 (e.g. a height thereof) are selected to position a lower edge 114 of the optical coupling end 105-21 to reflect the light 106-2 into the rod 101-2, such that the light 106-2 does not otherwise exit through the lower wall of the rod 101-2 (e.g. as the lower wall of the rod 101-2 would not be at a total internal reflection angle to the light 106-2). However, the walls of the rods 101 may alternatively be coated with a reflecting material.

Similarly, as depicted, a path of the light 106-1 is selected to reflect from an edge 115 of the optical coupling end 105-22 that is adjacent a wall of the remainder of the rod 101 (e.g. as depicted, and with respect to the page of FIG. 1, an upper wall, though the device 100 may be in any suitable orientation). It is further understood that that edges 117 of the optical coupling ends 105-22, 105-3 that are adjacent are selected to about align with each other. As such, the dimensions of the rod 101-3 (e.g. a height thereof) are selected to position a lower edge 116 of the optical coupling end 105-3 to reflect the light 106-1 into the rod 101-3 such that the light 106-2 does not otherwise exit through the lower wall of the rod 101-3 (e.g. as the lower wall of the rod 101-3 would not be at a total internal reflection angle to the light 106-1). However, the walls of the rods 101 may alternatively be coated with a reflecting material.

Indeed, the light 106-1, 106-2 reflecting from extreme edges of the optical coupling ends 105-1, 105-22 represent worst cases in the device 100 and, as will be explained in more detail below, the dimensions of the rods 101 are selected accordingly.

Figure 2:
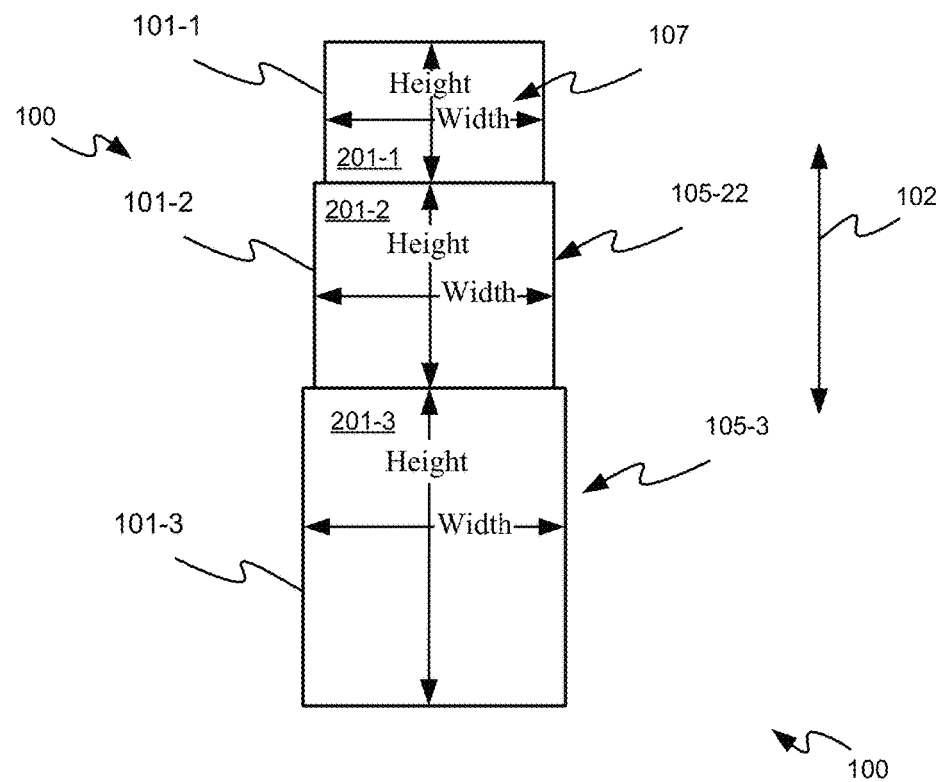
FIG. 2 depicts an end schematic view of the folded integrator rod device, according to non-limiting examples.

Attention is next directed to FIG. 2 which depicts an end view of the device 100 showing an end that includes the light entrance face 107 of the first integrator rod 101-1, and the optical light coupling ends 105-22, 105-3, respectively, of the second integrator rod 101-2 and the third integrator rod 101-3. In particular, each of the rods 101 have a respective cross section 201-1, 201-2, 201-3 that each include a respective height dimension (labelled as "Height" in FIG. 2) and a respective width dimension (labelled as "Width" in FIG. 2) larger than the respective height dimension. For example, the first integrator rod 101-1 has a cross-section 201-1, the second integrator rod 101-2 has a cross-section 201-2, and the third integrator rod 101-3 has a cross-section 201-3. The cross-sections 201-1, 201-2, 201-3 are interchangeably referred to hereafter, collectively, as the cross-sections 201 and, generically, as a cross-section 201.

As clearly seen in FIG. 2, a respective cross-section 201 of each of the plurality of integrator rods 101, other than a first integrator rod 101-1, is larger than the respective cross-section 201 of a previous adjacent integrator rod 101 in the series of rods 101. Hence, for example, the cross-section 201-2 of the second integrator rod 101-2 is larger than the cross-section 201-1 of the first (e.g. previous adjacent) integrator rod 101-1 in the series of rods 101; similarly, the cross-section 201-3 of the third integrator rod 101-3 is larger than the cross-section 201-2 of the second (e.g. previous adjacent) integrator rod 101-2 in the series of rods 101. Put another way, each of the respective height dimension and the respective width dimension of each of the plurality of integrator rods 101 may be larger than the respective height dimension and the respective width dimension of a previous adjacent integrator rod 101 in the series of rods 101. In particular, a height of each successive integrator rod 101 in the series of rods 101 increases depending on number of factors as described in more detail below with regards to FIG. 3; a width of each successive integrator rod 101 in the series of rods 101 may increase depending on an incident angle of the light 106 onto the light entrance face 107, and gaps between the rods 101 (e.g. when present. However, as a gap between two adjacent rods 101 approaches zero an increase in width therebetween also approaches zero; in other words, while a successive adjacent rod 101 has a larger height than a previous adjacent rod 101, when a gap therebetween is zero, their widths may be similar.

Hence, in general, the height of the rods 101 may increase at a faster rate than the width (e.g. from rod 101 to rod 101 in the series of rods 101); however, an aspect ratio of the light exit face 109 of the last rod 101-3 may generally have a light modulator-associated aspect ratio; such a light modulator-associated aspect ratio may be the same and/or similar as an aspect ratio of a light modulation device to which the light 106 that exits the exit face 109 is conveyed (e.g. by optics, not depicted, between the exit face 109 and the light modulation device). However, the light modulator-associated aspect ratio may not be an exact aspect ratio of the light modulation device to which the light 106 that exits the exit face 109 is conveyed, but the light modulator-associated aspect ratio may be approximately such an aspect ratio; in other words, an aspect ratio of the light that exits the exit face 109 may be further shaped by optics in the projector; and/or the aspect ratio of the light that exits the exit face 109 may have an aspect ratio that causes the light to illuminate the light modulation device to which the light 106 that exits the exit face 109 is conveyed such that the light is modulated to form an image by the light modulation device.

As depicted, the plurality of integrator rods 101 are further arranged such that their respective height dimensions are aligned in the substantially perpendicular direction 102 of the series of rods 101. In other words, the respective height dimensions are generally parallel to each other and arranged along the substantially perpendicular direction 102.

Returning to FIG. 1, it is apparent that the rods 101 are depicted from a side showing the relative respective height dimensions of the rods 101. In particular, the respective height dimensions of the rods 101 increase with each rod 101 in the series of rods 101 to accommodate the reflection of the light 106 from extreme edges of the optical coupling ends 105 as described above. In other words, the respective height dimensions of the rods 101 increase with each rod 101, in the series of rods 101, to extend a respective optical coupling end 105 of a given rod 101 (e.g. relative to a respective optical coupling end 105 of a previous rod 101), to ensure that light reflected from an edge of a respective optical coupling end 105 of a previous rod 101 is reflected by the respective optical coupling end 105 and does not otherwise exit the given rod 101 (e.g. when walls are not coated with a reflecting material). While the same effect could be achieved by increasing the height dimension without necessarily increasing the width dimension of the rods 101 (e.g. when gaps therebetween are zero), the width dimension may also be increased as gaps therebetween are increased. However, the aspect ratio of exit face 109 of the last rod 101-3 is selected to be a light modulator-associated aspect ratio, as described previously.

Figure 3:
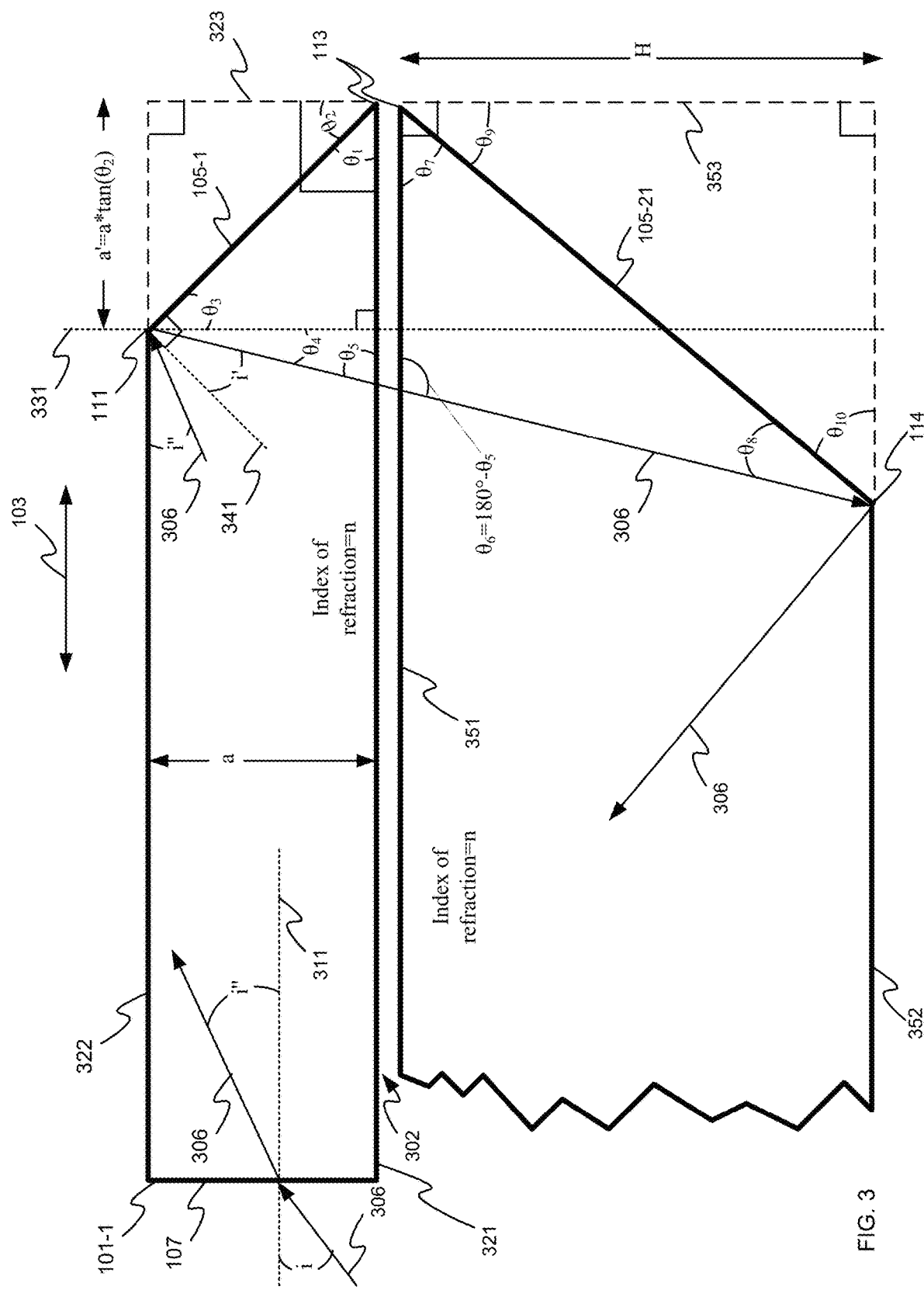
FIG. 3 depicts details of geometry of two of integrator rods of the folded integrator rod device, according to non-limiting examples.

Attention is next directed to FIG. 3 which depicts details of a geometry of the rods 101-1, 101-2. As depicted, only a portion of the rod 101-2 is depicted that includes the optical coupling end 105-21. Furthermore, as depicted, there is a gap 302 between the rods 101-1, 101-2, however hereafter it will be assumed that the gap 302 is "0 (i.e. the rods 101-1, 101-2 are touching). In particular, light 306 (which may include, but is not limited to, any of the light 106-1, the light 106-2, and the light 106-3) enters the light entrance face 107 of the rod 101-1 at an incident angle "i" (e.g. to a normal 311 to the light entrance face 107) and is diffracted at an angle "i'" due to Snell's law (e.g. based on the index of refraction "n" of the rod 101-1; indeed, in the depicted example both the rods 101-1, 101-2 have an index of refraction "n").

While reflections from the walls of the rod 101-1 are not depicted, it is assumed in FIG. 3 that the light 306 propagates through the rod 101-1, reflecting from the walls and eventually reflects from the edge 111 of the optical coupling end 105-1 which, as described above, represents a worst case of light interacting with the optical coupling end 105-1. To account for this worst case, the geometry of the rod 101-2, and specifically the height thereof (e.g. which, may also take into account the gap 302 when a non-zero value), is selected such that the lower edge 114 of the optical coupling end 105-21 of the rod 101-2 is positioned to reflect the light 306 into the rod 101-1. Determination of the geometry of the rod 101-2 is described hereafter.

As depicted, the height of the rod 101-1 is "a", and the optical coupling end 105-1 forms an angle $\theta_1$ that with a lower wall 321 of the rod 101-1. It is understood that the lower wall 321 is the wall of the rod 101-1 that is adjacent the rod 101-2 and that extends along the longitudinal axis 103.

For completeness, the upper wall 322 of the rod 101-1 is also indicated; is understood that the upper wall 322 is opposite the lower wall 321 and/or is a wall of the rod 101-1 that is opposite the rod 101-2, and that extends along the longitudinal axis 103.

The walls 321, 322 may generally be about parallel, but do not have to be parallel and/or exactly parallel; indeed, the walls 321, 322 may be at least partially tapered relative to each other. As depicted, however, the walls 321, 322 are each about perpendicular with the light entrance face 107. The edge 111 of the rod 101-1 is understood to be at an intersection of the upper wall 322 and the optical coupling end 105-1, and the edge 113 of the rod 101-1 is understood to be at the intersection of the lower wall 321 and the optical coupling end 105-1.

As depicted, a line 323 forms a 90° angle with the lower edge 113 of the rod 101-1, and forms an angle $\theta_2$ with the optical coupling end 105-1 (e.g. $\theta_1+\theta_2=90°$). Hence, using basic geometry, and knowing that the height of the optical coupling end 105-1 is "a" (e.g. the height of the rod 101-1), the length of the optical coupling end 105-1 (e.g. along the longitudinal axis 103) is a'=a*tan($\theta_2$).

A normal 331 to the lower wall 321 that intersects the edge 111 is also depicted and forms an angle $\theta_3$ with the optical coupling end 105-1 (e.g. $\theta_3=\theta_2$). Also depicted is a normal 341 to the optical coupling end 105-1 at the edge 111. From the geometry the light 306 is reflected from the optical coupling end 105-1 at an angle i' relative to the normal 341, the angle i' generally depending on the angle i, the index of refraction n, and the angle $\theta_2$, and/or the angle $\theta_3$. Also depicted is the angle $\theta_4$ that the light 306 forms with the normal 331 upon reflection and the angle $\theta_5$ that the light 306 forms with the lower wall 321 as the light 306 exits the rod 101-1 through the lower wall 321.

Presuming the lower wall 321 and an upper wall 351 of the rod 101-2 (e.g. adjacent the lower wall 321 of the rod 101-1) are about parallel, the light 306 forms an angle $\theta_6=180°-\theta_5$ with the upper wall 351.

Indeed, it is understood that the upper wall 351 is the wall of the rod 101-2 that is adjacent the rod 101-1 and that extends along the longitudinal axis 103. It is further understood that the lower wall 352 is opposite the upper wall 351 and/or is a wall of the rod 101-2 that is opposite the rod 101-1 (and/or adjacent the rod 101-3, not depicted in FIG. 3 but understood to be present), and that extends along the longitudinal axis 103. The walls 351, 352 may generally be about parallel, but do not have to be parallel and/or exactly parallel; indeed, the walls 351, 352 may be tapered relative to each other. The edge 113 of the rod 101-2 is understood to be at the intersection of the wall 351 and the optical coupling end 105-2, and the edge 114 of the rod 101-2 is understood to be at the intersection of the wall 352 and the optical coupling end 105-21.

Also depicted, for completeness, is the angle $\theta_7$ which the optical coupling end 105-21 forms with the upper wall 351 of the rod 101-2, and the angle $\theta_8$ that the light 306 forms with the optical coupling end 105-21.

Also depicted, is the distance and/or height of the rod 101-2; for example, a distance "H" is a perpendicular distance between the walls 351, 352 of the rod 101-2. For completeness, a line 353 is depicted which forms a 90° angle with the upper wall 351 of the rod 101-2, the line 353 forming an angle $\theta_9$ with the optical coupling end 105-21 (e.g. $\theta_7+\theta_9=90°$); also for completeness, an angle $\theta_{10}$ is indicated which is the acute angle between the optical coupling end 105-21 and the lower wall 352 of the rod 101-2.

As depicted, the light 306 reflected by the edge 113 is also reflecting from the edge 114.

In any event, from the depicted geometry, the height "H" may be derived as:

$$H(a, i, n, \theta_1, \theta_5) = a * \frac{\cos(A) * \sin(\theta_5) * \left(\frac{1}{\tan(\theta_1)} + \tan(A)\right)}{\sin\left((2*\theta_1 + \theta_5) + a\sin\left(\frac{\sin(i)}{n}\right)\right)} \quad \text{Equation (1)}$$

where $$A = 2*\theta_1 - \frac{\pi}{2} + a\sin\left(\frac{\sin(i)}{n}\right) \quad \text{Equation (2)}$$

However, while the distance H is expressed with regards to $\theta_1$, $\theta_5$, the distance H may be expressed with respect to other angles of the rod 101-1.

Furthermore, it is assumed in Equation (1) and Equation (2) that the angles $\theta_1$, $\theta_7$ are the same; however, in other examples, the angles $\theta_1$, $\theta_7$ may be different with the Equation (1) and Equation (2) adjusted accordingly.

Furthermore, the geometry of the rod 101-3 may be selected in a similar manner.

While as described herein, the optical coupling ends 105 are angled along the height dimension of the rods 101, in other examples, the optical coupling ends 105 may be angled along the width dimension of the rods 101, with the rods 101 each rotated by 90° with respect to the example of FIG. 1, FIG. 2, and FIG. 3, and with the remainder of the geometry of the device 100 adjusted accordingly.

Figure 4:
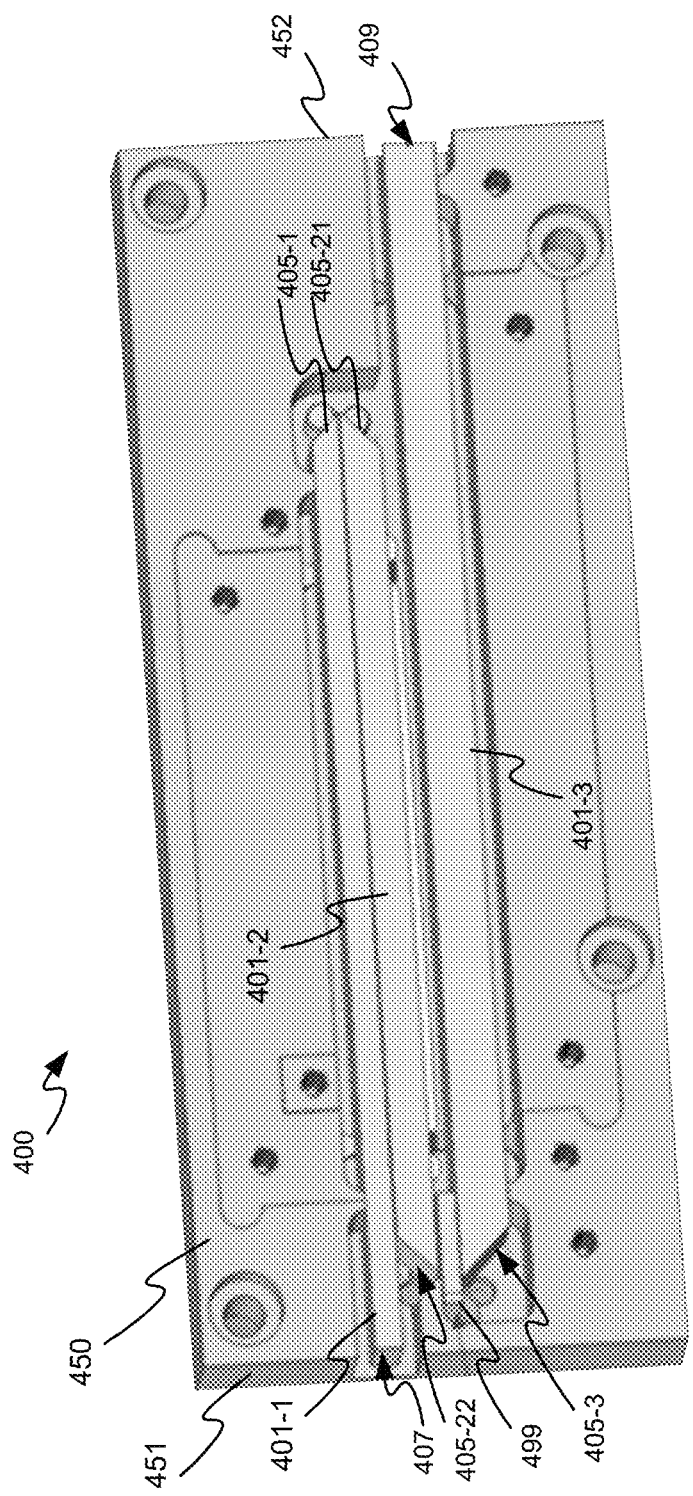
FIG. 4 depicts a side schematic view of a folded integrator rod device adapted to include a mounting plate, according to non-limiting examples.

Attention is next directed to FIG. 4 which depicts a perspective view of a device 400 which is substantially similar to the device 100, with like components having like numbers, however in a "400" series rather than a "100" series. Hence, the device 400 comprises integrator rods 401-1, 401-2, 401-3 (interchangeably referred to hereafter, collectively, as the rods 401 and, generically, as a rod 401), that are arranged relative to one another in a series, similar to the rods 101.

The rod 401-1 comprises an optical coupling end 405-1, the rod 401-2 comprises optical coupling ends 405-21, 405-22, and the rod 401-3 comprises an optical coupling end 405-3. The optical coupling ends 405-1, 405-21, 405-22, 405-3 are interchangeably referred to hereafter, collectively, as the optical coupling ends 405 and, generically, as an optical coupling end 405.

The rod 401-1 further comprises a light entrance face 407, and the rod 401-3 further comprises a light exit face 409.

While not depicted, light enters the light entrance face 407 of the rod 401-1 and propagates through the rod 401-1 to the optical coupling end 405-1, which reflects the light via total internal reflection into the rod 401-2, and towards the optical coupling end 405-21, with the geometry of the rod 401-2 selected accordingly (e.g. as described above). The light is reflected from the optical coupling end 405-21, which reflects the light via total internal reflection through the rod 401-2 towards the optical coupling end 405-22. The light is reflected from the optical coupling end 405-22, which reflects the light via total internal reflection into the rod 401-3 towards the optical coupling end 405-3, with the geometry of the rod 401-3 selected accordingly. The light is reflected from the optical coupling end 405-3, which reflects the light via total internal reflection through the rod 401-3 towards the light exit face 409.

Hence, device 400 has similar functionality to the device 100.

However, in contrast to the device 100, the device 400 comprises a mounting plate 450 onto which the rods 401 are mounted, using any suitable combination of mounting components. The rods 401 are mounted such that the light entrance face 407 is about aligned with a first edge of the plate 450, and such that the light entrance face 409 is about aligned with a second edge of the plate 450, the second edge 452 opposite the first edge 451. The device 400 may hence be a component which may be sold and/or provided for incorporation into a projector, in which the plate 450 is positioned such that the light entrance face 407 receives light from a light source, and the light exit face 409 is positioned such that homogenized light enters optics, and the like, which conveys the homogenized light to a light modulation device, such as a digital micromirror device, and the like.

In further contrast to the device 100, the device 400 comprises an optical component 499 located in a gap between the rod 401-2 and the rod 401-3, and aligned with the optical coupling ends 405-22, 405-3 such that light reflected from the optical coupling end 405-22 (e.g. towards the optical coupling end 405-3) passes through the optical component 499. While not depicted, the device 400 may further comprise a second optical components located in a gap between the rod 401-1 and the rod 401-2, and aligned with the optical coupling ends 405-1, 405-21 such that light reflected from the optical coupling end 405-1 (e.g. towards the optical coupling end 405-21) passes therethrough; alternatively, the optical component 499 may be located between the rods 401-1, 401-2 and not between the rods 401-1, 401-2.

In some examples, the optical component 499 comprises at least one of a diffuser and a uniformity improving optical component between the respective optical coupling ends 405 of at least one of a pair of adjacent integrator rods 401. Indeed, in general, the device 400 may comprise at least one optical component 499 which changes the light between the respective optical coupling ends 405 of at least one of a pair of adjacent integrator rods 401. For example, the at least one optical component may comprise one or more of: a diffuser; a uniformity improving optical component; a depolarizer; a polarizer; a contrast changing optical component and an aperture, however any suitable optical component is within the scope of the present specification.

The device 100 and the device 400 each include a first integrator rod (the rods 101-1, 401-1), a last integrator rod (e.g. the rod 101-3, 401-3), and an integrator rod (e.g. the rod 101-2, 401-2) between the first integrator rod and the last integrator rod. The integrator rod between the first integrator rod and the last integrator rod of the device 100 and the device 400 comprises: a first optical coupling end (e.g. the optical coupling ends 105-21, 405-21) and a second optical coupling end (e.g. the optical coupling ends 105-22, 405-22), the first optical coupling end configured to receive the light from the first integrator rod and reflect the light towards the second optical coupling end, the second optical coupling end configured to receive the light from the first optical coupling end and reflect the light towards the last integrator rod.

However, other examples are within the scope of the present specification.

Figure 5:
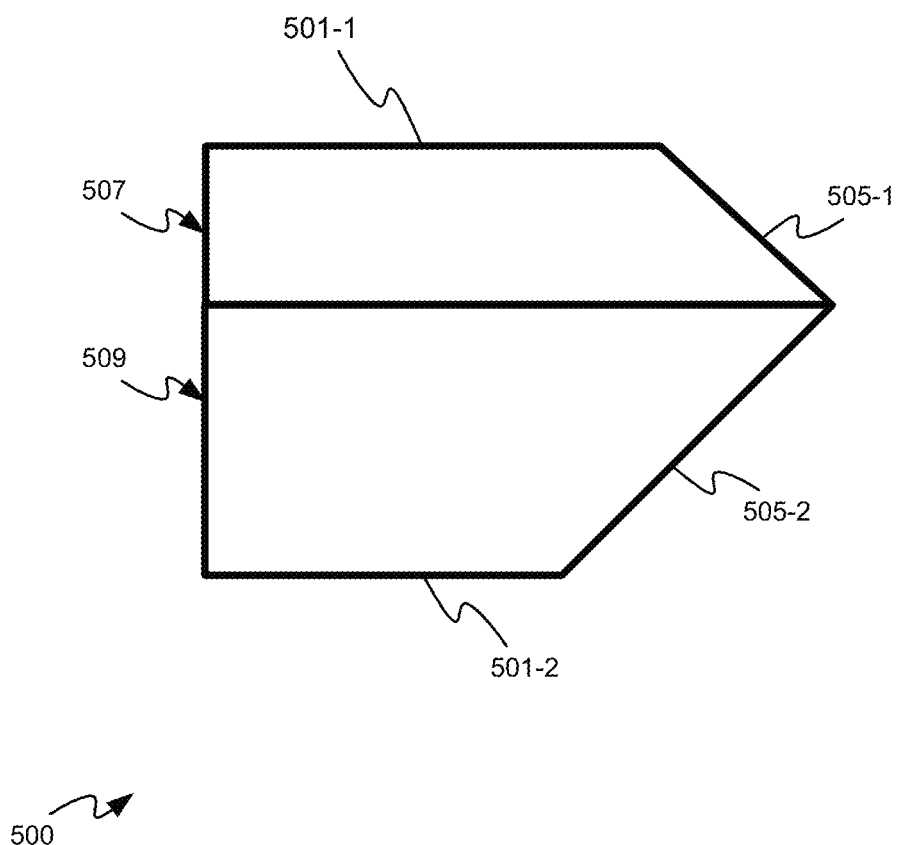
FIG. 5 depicts a side schematic view of a folded integrator rod device that includes two integrator rods, according to non-limiting examples.

For example, attention is next directed to FIG. 5 which depicts a device 500 which includes a first integrator rod 501-1 and a last integrator rod 501-2, without other integrator rods therebetween. The device 500 is otherwise similar to the device 100, with like components having like numbers, however in a "500" series rather than a "100" series.

Hence, the device 500 comprises the integrator rods 501-1, 501-2 (interchangeably referred to hereafter, collectively, as the rods 501 and, generically, as a rod 501), that are arranged relative to one another, in a series, similar to the rods 101.

Furthermore, the rod 501-1 comprises an optical coupling end 505-1, and the rod 501-2 comprises an optical coupling end 505-2. The optical coupling ends 505-1, 505-2 are interchangeably referred to hereafter, collectively, as the optical coupling ends 505 and, generically, as an optical coupling end 505.

The rod 501-1 further comprises a light entrance face 507, and the rod 501-2 further comprises a light exit face 509.

While not depicted, as in the device 100, light enters the light entrance face 507 of the rod 501-1 and propagates through the rod 501-1 to the optical coupling end 505-1, which reflects the light via total internal reflection into the rod 501-2, and towards the light exit face 509, with the geometry of the rod 501-2 selected accordingly (e.g. as described above). The light exits the light exit face 509 as homogenized light.

Hence, device 500 has similar functionality to the device 100. However, the homogenized light exits the device 500 in a direction opposite to that of the device 100. Hence, for example, the device 500 may be adapted to include mirrors, prisms and the like to redirect homogenized light exiting the light exit face 509, for example, in same direction as the light entering the light entrance face 507 and/or towards optics, and the like, which conveys the homogenized light to a light modulation device, such as a digital micromirror device, and the like.

Other examples are within the scope of the present specification.

Figure 6:
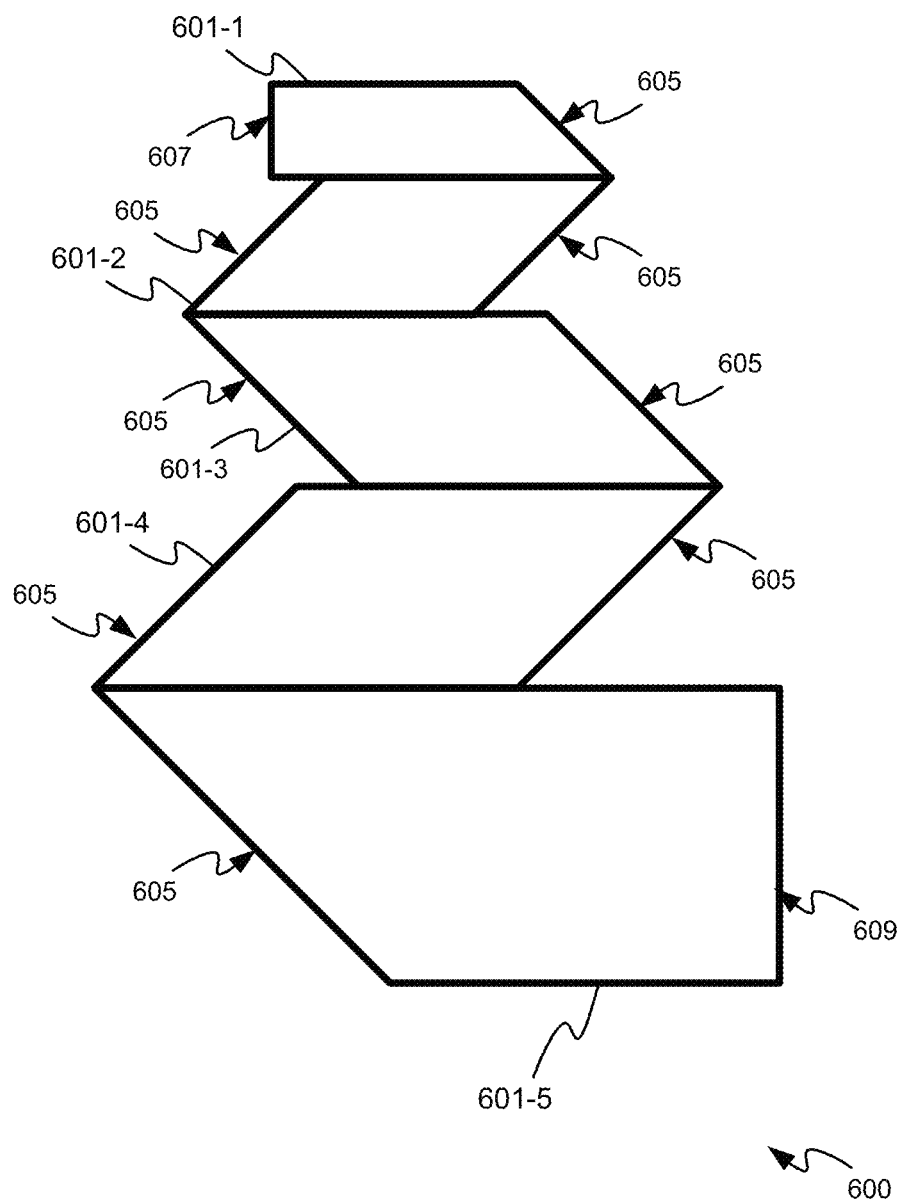
FIG. 6 depicts a side schematic view of a folded integrator rod device that includes five integrator rods, according to non-limiting examples.

For example, attention is next directed to FIG. 6 which depicts a device 600 which includes a first integrator rod 601-1, a second integrator rod 601-2, a third integrator rod 601-3, a fourth integrator rod 601-4 and a last integrator rod 601-5, arranged in a series. The device 600 is otherwise similar to the device 100, with like components having like numbers, however in a "600" series rather than a "100" series.

Hence, the device 600 comprises the integrator rods 601-1, 601-2, 601-3, 601-4, 601-5 (interchangeably referred to hereafter, collectively, as the rods 601 and, generically, as a rod 601), that are arranged relative to one another, in a series, similar to the rods 101.

Furthermore, each of the rods 601 comprise at least one optical end 605 configured to reflect light into a next integrator rod 601 or receive light from a previous integrator rod 601. The rod 601-1 further comprises a light entrance face 607, and the rod 601-5 further comprises a light exit face 609.

While not depicted, as in the device 100, light enters the light entrance face 607 of the rod 601-1 and propagates through the rod 601-1 to a respective optical coupling end 605, which reflects the light via total internal reflection into the rod 601-2, where the light is reflected by a corresponding optical coupling end 605 towards an opposite optical coupling end 605, which in turn reflects the light into the rod 601-3. The light propagates in this manner through the rods 601 and the optical coupling ends 605 until the light enters the rod 601-5 and is reflected (e.g. by a respective optical coupling end 605 of the rod 601-5) towards the light exit face 609. The light exits the light exit face 609 as homogenized light.

Hence, device 600 has similar functionality to the device 100. However, the device 600 includes three rods 601 between the first rod 601-1 and the last rod 601-5, rather than one rod 601. Furthermore, the cross-section of each of the rods 601 is larger than a respective cross-section of a previous adjacent integrator rod 601 in the series of rods 601.

Put another way, a subset of the plurality of integrator rods 601 (e.g. the rods 601-2, 602-3, 601-4) is located between the first integrator rod 601-1 and the last integrator rod 601-5 in the series of rods 601. The subset of the plurality of integrator rods 601 (e.g. the rods 601-2, 602-3, 601-4) each include a first optical coupling end 605 and a second optical coupling end 605, the first optical coupling end 605 configured to receive the light from a previous adjacent integrator rod 601 and reflect the light towards the second optical coupling end 605, the second optical coupling end 605 configured to receive the light from the first optical coupling end 605 and reflect the light towards a next adjacent integrator rod 601 in the series of rods 601.

Indeed, while three integrator rods 601 are between the first integrator rod 601-1 and the last integrator rod 601-5, the device 600 may include any suitable number of rods 601 between the first integrator rod 601-1 and the last integrator rod 601-5. When the number of rods 601 between the first integrator rod 601-1 and the last integrator rod 601-5 is an odd number (e.g. as depicted, and also similar to the device 100), light enters and exits the device 600 in a same direction. However, when the number of rods 601 between the first integrator rod 601-1 and the last integrator rod 601-5 is "zero" or an even number (e.g. similar to the device 500), light enters and exits the device 600 in opposite directions.

Other examples are within the scope of the present specification.

Figure 7:
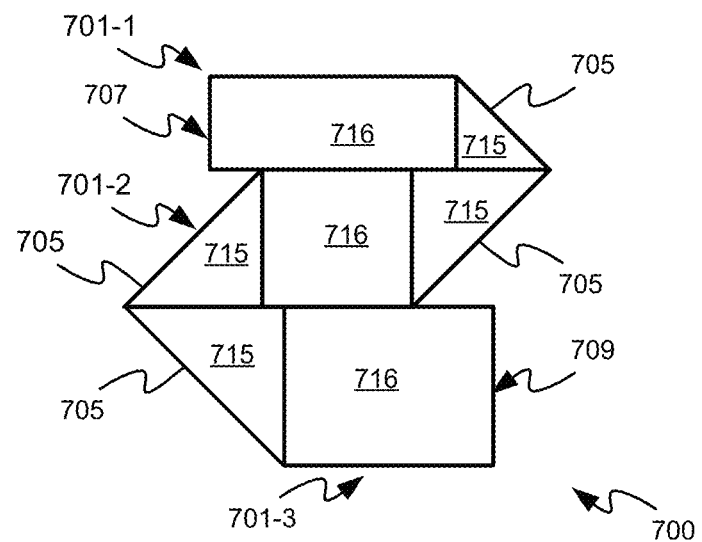
FIG. 7 depicts a side schematic view of a folded integrator rod device that includes prisms, according to non-limiting examples.

For example, attention is next directed to FIG. 7 which depicts a device 700. The device 700 is otherwise similar to the device 100, with like components having like numbers, however in a "700" series rather than a "100" series. The device 700 includes a first integrator rod 701-1, a second integrator rod 701-2, and a last integrator rod 701-3, (interchangeably referred to hereafter, collectively, as the rods 701 and, generically, as a rod 701), that are arranged relative to one another similar to the rods 101. The rods 701 further include respective optical coupling ends 705, the rod 701-1 includes a light entrance face 707 and the rod 701-3 includes a light exit face 709

However, in contrast to the device 100, the plurality of integrator rods 701 include prisms 715 located at the respective optical coupling ends 705, the prisms 715 configured to optically couple the respective optical coupling ends 705 via total internal reflection.

Hence, each of the rods 701 include at least one prism 715 (e.g. in a one-to-one relationship with the optical coupling ends 705), and a rod portion 716, though the prisms 715 and the rod portions 716 can be made of the same material. While the device 700 includes more parts than the device 100, the individual parts of the device 700 may be easier to manufacture than the individual parts of the device 100.

Figure 8:
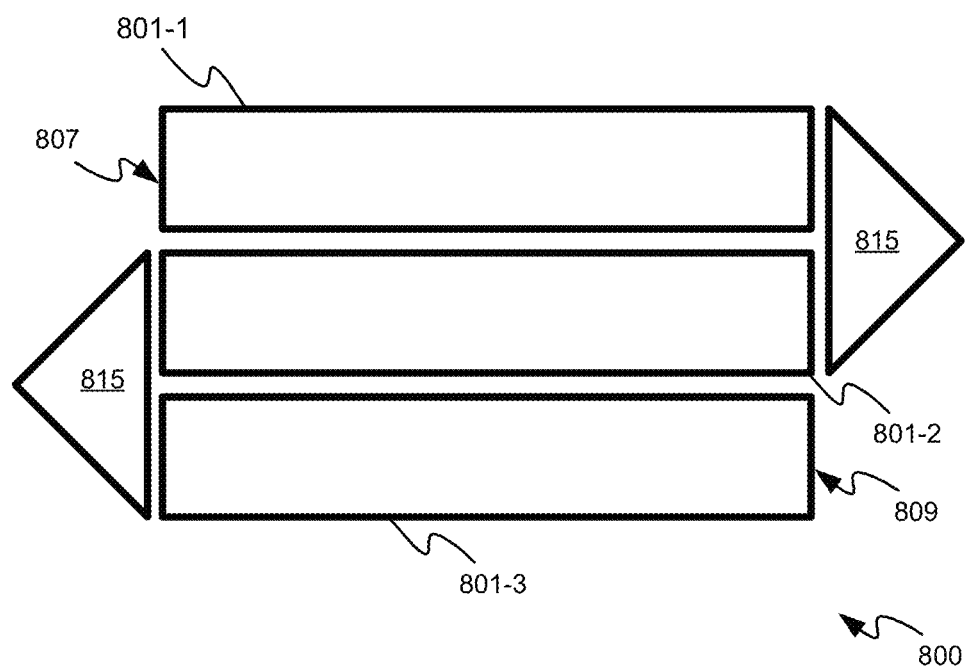
FIG. 8 depicts a side schematic view of an alternative folded integrator rod device that includes prisms, according to non-limiting examples.

In yet further examples, fewer prisms may be used to optically couple integrator rods together. For example, attention is next directed to FIG. 8 which depicts a device 800 that includes a plurality of integrator rods 801-1, 801-2, 801-3 (interchangeably referred to hereafter, collectively, as the rods 801 and, generically, as a rod 801) arranged in a series, similar to the device 100. However, pairs of the rods 801 are coupled together with respective prisms 815 that receive light from a first rod 801 and convey light into a next rod 801, with one prism 815 being provided per pair of rods 801 (e.g. the three rods 801 form two pairs of rods 801). Hence, light enters a light entrance face 807 of the first rod 801, and is conveyed through the rods 801 via the prisms 815, and exits a light exit face 809 of the last rod 801-3. In further contrast to the device 100, the rods 801 may be of similar cross-section; however, in some examples, the walls of the rods 801 may be coated in a reflecting material to prevent light from exiting therethrough.

Figure 9:
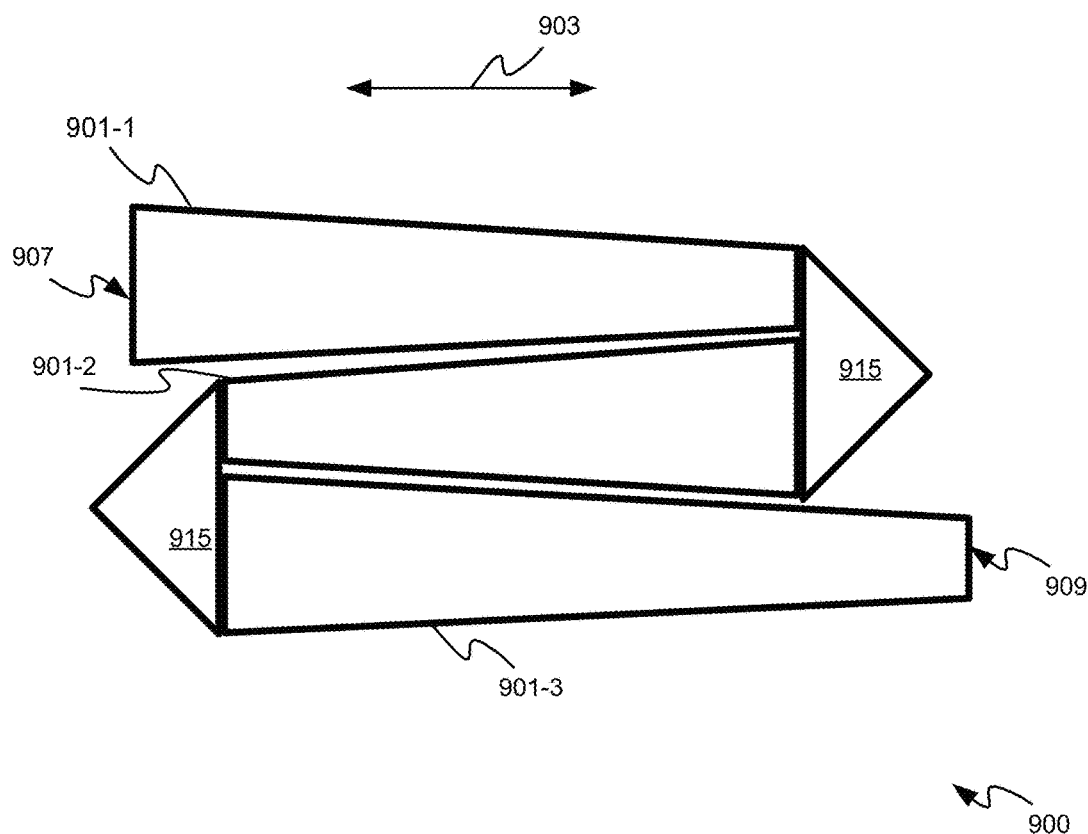
FIG. 9 depicts a side schematic view of an alternative folded integrator rod device that includes prisms and tapered integrator rods, according to non-limiting examples.

In yet further examples, integrator rods may be tapered. For example, attention is next directed to FIG. 9 which depicts a device 900 that includes a plurality of integrator rods 901-1, 901-2, 901-3 (interchangeably referred to hereafter, collectively, as the rods 901 and, generically, as a rod 901) arranged in a series, with pairs of the rods 901 coupled together with respective prisms 915 that receive light from a first rod 901 and convey light into a next rod 901, with one prism 915 being provided per pair of rods 901 (e.g. the three rods 901 form two pairs of rods 901). Hence, light enters a light entrance face 907 of the first rod 901, and is conveyed through the rods 901 via the prisms 915, and exits a light exit face 90 of the last rod 901-3. In some examples, the walls of the rods 901 may be coated in a reflecting material to prevent light from exiting therethrough.

However, in contrast to the device 800, the rods 901 of the device 900 are tapered along their respective longitudinal axes 903, with, for example, the rod 901-1 decreasing in cross-section from the light entrance face 907 to an opposite end adjacent a respective prism 915. Similarly, the rod 901-2 decreases in cross-section from a first prism 915, where light enters the rod 901-2, to an opposite end where light exits the 901-2. Similarly, the rod 901-3 decreases in cross-section from a prism 915, where light enters the rod 901-3, to the light exit face 909. The geometry of the prisms 915 are adapted accordingly.

Any of the example devices described heretofore may be adapted to include gaps between adjacent integrator rods, and/or adapted such that adjacent integrator rods are touching. Furthermore, any of the example devices described heretofore may be adapted to include at least one optical component which changes light between respective optical coupling ends of at least one pair of adjacent integrator rods.

Figure 10:
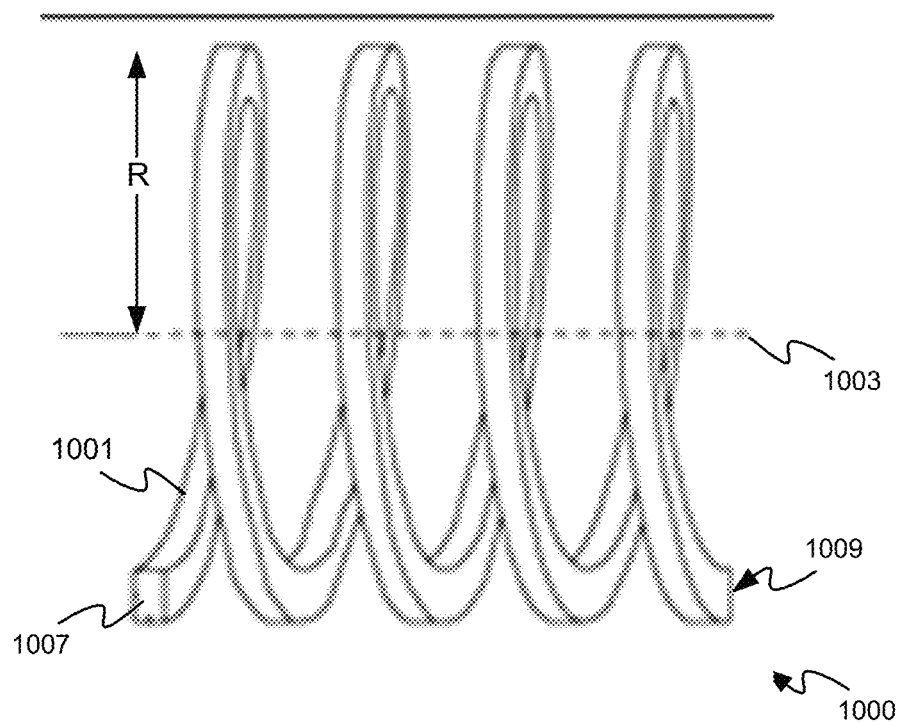
FIG. 10 depicts a side schematic view of an alternative integrator rod device that includes a single spiraled integrator rod, according to non-limiting examples.

In yet further examples, other shapes and/or geometries of integrator rods may be used to reduce a length used to homogenize light. For example, attention is directed to FIG. 10 which depicts a device 1000 that comprises a single integrator rod 1001 arranged in a spiral shape, for example about a longitudinal axis 1003, and having a radius "R". The rod 1001 has a light entrance face 1007 and a light exit face 1009. Light enters the light entrance face 1007 and is spirally propagated around the rod 1001, being homogenized as the light propagates, before exiting the light exit face 1009. The spiral shape of the rod 1001 allows the light to propagate and homogenize in a more compact space than a single integrator rod.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some embodiments, the terms are understood to be "within 10%," in other embodiments, "within 5%", in yet further embodiments, "within 1", and in yet further embodiments "within 0.5%".

Persons skilled in the art will appreciate that there are yet more alternative embodiments and modifications possible, and that the above examples are only illustrations of one or more embodiments. The scope, therefore, is only to be limited by the claims appended hereto.

We claim:

1. A device comprising:
   a plurality of integrator rods that are substantially parallel and arranged adjacent to each other in a series in a substantially perpendicular direction to longitudinal axes thereof,
   pairs of adjacent integrator rods in the series being optically coupled at respective optical coupling ends via total internal reflection,
   a respective cross-section of each of the plurality of integrator rods, other than a first integrator rod, being larger than the respective cross-section of a previous adjacent integrator rod in the series,
   the first integrator rod in the series comprising a light entrance face configured to receive light, the light entrance face opposite an optical coupling end of the first integrator rod, and
   a last integrator rod in the series comprising a light exit face configured to emit the light, the light exit face opposite a respective optical coupling end of the last integrator rod,
   wherein each of respective cross-sections of the plurality of integrator rods comprises a respective height dimension and a respective width dimension of the plurality of integrator rods, such that the respective height dimension and the respective width dimension of each of the plurality of integrator rods is larger than the respective height dimension and the respective width dimension of the previous adjacent integrator rod in the series.

2. The device of claim 1, the pairs of adjacent integrator rods in the series being optically coupled at the respective optical coupling ends via total internal reflection to substantially reverse a travel direction of the light as the light is reflected from a first adjacent integrator rod in a pair to a next adjacent integrator rod in the pair.

3. The device of claim 1, wherein each of the plurality of integrator rods are angled at a total internal reflection angle at the respective optical coupling ends to optically couple the respective optical coupling ends via total internal reflection.

4. The device of claim 1, wherein the respective cross-section comprises a respective height dimension and a respective width dimension, and the respective width dimension is larger than the respective height dimension, the plurality of integrator rods being further arranged such that their respective height dimensions are aligned in the substantially perpendicular direction of the series.

5. The device of claim 1, wherein the plurality of integrator rods comprises only the first integrator rod and the last integrator rod adjacent the first integrator rod.

6. The device of claim 1, wherein the plurality of integrator rods comprises the first integrator rod, the last integrator rod, and an integrator rod between the first integrator rod and the last integrator rod, the integrator rod between the first integrator rod and the last integrator rod comprising: a first optical coupling end and a second optical coupling end, the first optical coupling end configured to receive the light from the first integrator rod and reflect the light towards the second optical coupling end, the second optical coupling end configured to receive the light from the first optical coupling end and reflect the light towards the last integrator rod.

7. The device of claim 1, wherein a subset of the plurality of integrator rods located between the first integrator rod and the last integrator rod in the series each include a first optical coupling end and a second optical coupling end, the first optical coupling end configured to receive the light from the previous adjacent integrator rod and reflect the light towards the second optical coupling end, the second optical coupling end configured to receive the light from the first optical coupling end and reflect the light towards a next adjacent integrator rod in the series.

8. The device of claim 1, further comprising at least one of a diffuser and a uniformity improving optical component between the respective optical coupling ends of at least one of the pairs of the adjacent integrator rods.

9. The device of claim 1, further comprising at least one optical component which changes the light between the respective optical coupling ends of at least one of the pairs of the adjacent integrator rods.

10. The device of claim 9, wherein the at least one optical component comprises one or more of: a diffuser; a uniformity improving optical component; a depolarizer; a polarizer; a contrast changing optical component; and an aperture.

11. The device of claim 1, wherein the plurality of integrator rods includes prisms located at the respective optical coupling ends, the prisms configured to optically couple the respective optical coupling ends via total internal reflection.

12. The device of claim 11, wherein one or more of the plurality of integrator rods are tapered along their respective longitudinal axes.

13. The device of claim 11, wherein the light exit face of the last integrator rod has a light modulator-associated aspect ratio.

14. A device comprising:
a plurality of integrator rods that are substantially parallel and arranged adjacent to each other in a series in a substantially perpendicular direction to longitudinal axes thereof,
pairs of adjacent integrator rods in the series being optically coupled at respective optical coupling ends via total internal reflection,
a respective cross-section of each of the plurality of integrator rods, other than a first integrator rod, being larger than the respective cross-section of a previous adjacent integrator rod in the series,
the first integrator rod in the series comprising a light entrance face configured to receive light, the light entrance face opposite an optical coupling end of the first integrator rod, and
a last integrator rod in the series comprising a light exit face configured to emit the light, the light exit face opposite a respective optical coupling end of the last integrator rod,
wherein the plurality of integrator rods comprises the first integrator rod, the last integrator rod, and an integrator rod between the first integrator rod and the last integrator rod, the integrator rod between the first integrator rod and the last integrator rod comprising: a first optical coupling end and a second optical coupling end, the first optical coupling end configured to receive the light from the first integrator rod and reflect the light towards the second optical coupling end, the second optical coupling end configured to receive the light from the first optical coupling end and reflect the light towards the last integrator rod.

15. A device comprising:
a plurality of integrator rods that are substantially parallel and arranged adjacent to each other in a series in a substantially perpendicular direction to longitudinal axes thereof,
pairs of adjacent integrator rods in the series being optically coupled at respective optical coupling ends via total internal reflection,
a respective cross-section of each of the plurality of integrator rods, other than a first integrator rod, being larger than the respective cross-section of a previous adjacent integrator rod in the series,
the first integrator rod in the series comprising a light entrance face configured to receive light, the light entrance face opposite an optical coupling end of the first integrator rod, and
a last integrator rod in the series comprising a light exit face configured to emit the light, the light exit face opposite a respective optical coupling end of the last integrator rod,
wherein a subset of the plurality of integrator rods located between the first integrator rod and the last integrator rod in the series each include a first optical coupling end and a second optical coupling end, the first optical coupling end configured to receive the light from the previous adjacent integrator rod and reflect the light towards the second optical coupling end, the second optical coupling end configured to receive the light from the first optical coupling end and reflect the light towards a next adjacent integrator rod in the series.

* * * * *